United States Patent [19]

Matumoto

[11] 4,419,894
[45] Dec. 13, 1983

[54] DETECTION OF ANGULAR LOCATION OF UNBALANCE OF A ROTOR AND POSITIONING OF THE LOCATION TO A PREDETERMINED ANGULAR POSITION

[75] Inventor: Sigeru Matumoto, Musashino, Japan

[73] Assignee: Kokusai Company, Ltd., Japan

[21] Appl. No.: 289,434

[22] Filed: Aug. 3, 1981

[30] Foreign Application Priority Data

Aug. 2, 1980 [JP] Japan ................................. 55-106598

[51] Int. Cl.³ ......................... G01M 1/22; G01M 1/26
[52] U.S. Cl. ...................................................... 73/462
[58] Field of Search .......................... 73/462, 464, 468

[56] References Cited

U.S. PATENT DOCUMENTS

| 3,302,491 | 2/1967 | Bjorn et al. | 73/462 |
| 3,854,339 | 12/1974 | Müller | 73/462 |
| 4,046,017 | 9/1977 | Hill | 73/462 |
| 4,201,091 | 5/1980 | Guyot et al. | 73/462 |

Primary Examiner—James J. Gill
Attorney, Agent, or Firm—Krass, Young & Schivley

[57] ABSTRACT

In a dynamic balancing machine for measuring amount and angular location of unbalance of a rotor piece during rotating the rotor piece by a drive motor, in order to position automatically the unbalance angular location to a predetermined angular position on bearings at a time of detection of the unbalance, a preset counter is used for providing a signal to stop the drive motor. Angular pulses each of which indicates rotation of the test rotor piece over a unit angular extent are generated by a rotary encoder, and phase indicating pulses are formed from the vibration signal from a vibration velocity pickup. After constant rotation of the drive motor, motor speed is reduced by a motor speed reduction signal, and, thereafter, the preset counter begins to count the angular pulses in response to presence of one pulse of the phase indicating pulses. When the preset counter counts up to a number preset therein, the drive motor stops, then the unbalance location is positioned to an angular position which is determined by the number in the preset counter and the unit angular extent.

An automatic marking device is fixedly disposed at the predetermined stop angular position and is driven after the motor stops. Thus, it is correctly and automatically performed to mark the unbalance location onto the test rotor piece.

16 Claims, 11 Drawing Figures

DETECTION OF ANGULAR LOCATION OF UNBALANCE OF A ROTOR AND POSITIONING OF THE LOCATION TO A PREDETERMINED ANGULAR POSITION

BACKGROUND OF THE INVENTION

This invention relates to dynamic or centrifugal balancing machines, and in particular, to automatic detection and positioning of the unbalance location of a rotor piece to a desired angular position.

In order to remove residual unbalance of worked rotor pieces, there have been used dynamic or centrifugal balancing machines where, during rotating the rotor piece, amount and angular location of the unbalance are detected. The detected unbalance is removed by a machine such as a grinding machine, a drilling machine and others.

In known dynamic balancing machines, a test rotor piece is rotatably supported on flexible bearings at opposite axial ends and is rotated. Pick-up units are coupled with the bearings to pick up once-per-revolution vibratory motion of the bearings of forces on the bearings due to unbalance in the test rotor. Vibration velocity pick-up units are usually used. Amounts of unbalance at axial opposite end planes of the rotor are obtained from amplitudes of signals picked up by respective pick-up units. In order to obtain unbalance measurements that apply to each balance plane separately, picked-up signals by both pick-up units are processed in plane separation circuits.

There have been known two typical ways in the prior art for detecting the angular location of unbalance of the rotor, one of which is, so called, the stroboscopic type, the other being the photocell type. Those two types will be described thereinafter referring to the accompanying drawings.

The former is known to be simple and the machine is relatively inexpensive. However, the operator must mark numbers on the test rotor piece and memorize the angle after measurement. Accordingly, the subsequent correction of the unbalance is subject to errors, meaning that the efficiency of the balancing work depends largely on the skill of the operator. Another problem is strain caused by stroboscopic flashing to the operator's eyes.

The latter is more advanced as the angular position can be presented in the form of an electrical signal for indication on a meter. However, the operator must still paint the reference mark on the test rotor piece. Furthermore, the operator must estimate the correct position corresponding to the angle on the meter as indicated assuming the reference mark to be 0°. This results in a phase error thereby causing an insufficient correction.

SUMMARY OF THE INVENTION

Therefore, it is an object of this invention to provide a system for readily and correctly detecting the angular location of unbalance of a test rotor piece without largely depending on the skill of operators, but with operator's simple task.

It is another object of this invention to provide a system for automatically detecting the angular location of unbalance of a test rotor piece without requiring a complicated task for operators and automatically and simultaneously positioning the detected location to a predetermined angular position.

It is still another object of this invention to provide a dynamic balancing machine where the angular location of unbalance of a test rotor piece is automatically detected without requiring any difficult task to operators and simultaneously positioned to a predetermined angular position, thereby to enable operators to correctly apply any marking of the unbalance location on the test rotor piece.

It is yet another object of this invention to provide an apparatus where the angular location of unbalance of a test rotor piece can be automatically and correctly detected without requiring operator's task and automatically is indicated on the test rotor means by marking.

It is another object of this invention to provide a dynamic balancing machine where the amount and angular location of unbalance of a test rotor piece are automatically correctly detected without operator's difficult task and the detected angular location is simultaneously positioned at a predetermined angular position with the detected amount indicated on a meter.

It is another object of this invention to provide a dynamic balancing macnine where marking of the unbalance is automatically performed onto the test rotor piece.

It is a further object of this invention to realize the objects as described above with a simple and economical construction.

According to this invention, a system is obtained for automatically detecting an angular location of unbalance of a rotor piece and simultaneously positioning the location to a predetermined stop angular position, which comprises: two bearing means for rotatably supporting the axial opposite ends of the rotor piece to be tested; drive motor means having motor controlling means; means for transmitting rotation of the drive motor means to the test rotor piece supported by the bearing means; pickup means coupled with at least one of the bearing means for picking up once-per-revolution vibrating motion of the bearing means or forces on the bearing means due to dynamic unbalance of the test rotor piece as a vibration signal; pulse forming circuit means for forming phase indicating pulse signals from the vibration signal, the phase indicating pulse signals presenting at every predetermined phases of the vibration signal and indicating the unbalance location passing a reference angular position; pulse generating means for generating angular pulse signals, each of the angular pulse signals indicating rotation of the test rotor piece over a predetermined unit angular extent; preset counter means in which a number of $(2n\pi + \alpha)/a$ should be preset, where n is a predetermined rotation number of the test rotor piece, $\alpha$ being an angle between the predetermined stop angular position and the reference angular position, and a being the unit angular extent; means for generating a motor speed reduction signal which is fed to the motor drive controlling means to reduce rotational speed of the drive motor means; means coupled with the pulse forming circuit means and the motor speed reduction signal generating means and for transmitting the angular pulse signals to the preset counter means after receiving one of the phase indicating pulse signals following the motor speed reduction signal; and the preset counter means providing a signal to stop the drive motor means at a time when the angular pulse signals are counted up to the preset number, whereby the drive motor means is immediately stopped so that the unbalance location of the test rotor piece is positioned to the predetrmined stop angular position.

In the preferred form of the invention, the pulse forming circuit means comprises filter means for removing background noise signals, waveform converting circuit means for converting the filtered signal to rectangular waveform signal, and differentiation circuit means to generate the phase indicating pulse signals from the rectangular wave signal.

Also in the preferred form of the invention, the angular pulse signals transmitting means comprises first flip-flop circuit means which are set by reception of the motor speed reduction signal, first gate circuit means which is opened by a set output from the first flipflop circuit means which are set by reception of one of the phase indicating pulse signals from the first gate circuit means, and second gate circuit means which is opened by the set output from the second flipflop circuit means to permit the angular pulse signals to pass to the preset counter means.

In an aspect of the present invention, the pulse generator means is a rotary encoder means which comprises a disk plate rotated by the drive motor means and having a plurality of marks which are equiangularly spaced on a circle about the rotating axis of the disk plate, and reading head means fixedly disposed and reading out the marks to provide the angular pulse signals during rotation of the disk plate.

The disk plate may be arranged to be rotated directly from the drive motor, or to be rotated with the test rotor piece through a belt means.

In another aspect of the present invention, a stepping motor is used for the drive motor means, and a drive pulse providing means of the stepping motor is used as the angular pulse signal generating means.

In a further aspect of the present invention, an automatic marking device is fixedly disposed at the predetermined stop angular position and is driven after the drive motor stops, so that it is correctly and automatically preformed to mark the unbalance location onto the test rotor piece.

Further objects, features and other aspects of the present invention will be understood from the following detailed description of the preferred embodiments of the present invention referring to the accompanying drawings.

DETAILED DESCRIPTION OF PREFERRED EMBODIMENT

Figure 1:
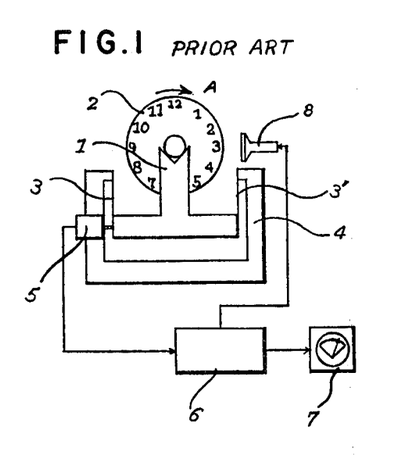
FIG. 1 is a schematic view of a known stroboscopic-type dynamic balancing machine.

Referring to FIG. 1, a known dynamic balancing machine of the stroboscopic type schematically shown therein includes flexible bearings (one of which is shown at 1) to rotatably support a test rotor piece 2 thereon. Bearing 1 is supported by leaf springs 3 and 3' on a fixed mount 4 and is elastically movable in a horizontal direction. A pickup unit 5 is coupled with flexible bearing 1 to pick up motion of flexible bearing 1 or forces on the bearing as an electric signal. A vibratory velocity pickup unit such as an electromagnetic pickup, an electrostatic pickup or the like is usually used for pickup unit 5, and is mounted on mount 4. Accordingly, when test rotor piece 2 is rotated on bearings 1, a vibration signal is obtained from pickup unit 5 in response to once-per-revolution vibratory motion of bearing 1 or forces on bearing 1 due to centrifugal force of unbalance in test rotor piece 2. The output of pickup unit 5 is coupled with an electronic circuit 6 accompanying a meter 7 to indicate mean voltage of the input signal. The value on meter 7 provides the amount of unbalance of test test rotor piece 2. Electronic circuit 6 forms pulses in synchronization with the signal from pickup unit 5. A stroboglow lamp 8 is fixedly disposed to confront an unbalance plane of test rotor piece 2 which is supported on bearings. Lamp 8 is excited by the pulses from electronic circuit 6 to detect the angular location of the unbalance in test rotor piece.

In operation, the operator marks numerals of different numbers at equiangularly spaced positions on an end surface of a test rotor piece, and put it on bearings 1. Then test rotor piece 2 is rotated at a constant speed by an electric motor (not shown) through a suitable rotation transmission.

Figure 2:
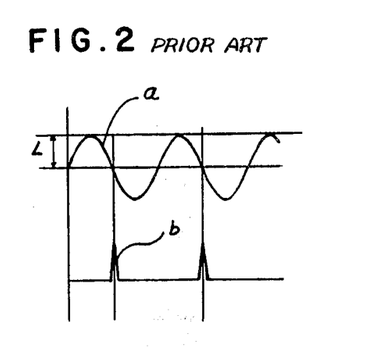
FIG. 2 is a view illustrating waveforms of two signals at different portions in the machine of FIG. 1.

A belt drive is usually used for the transmission. As a result, bearing 1 vibrates once per revolution of test rotor piece 2 due to the unbalance in test rotor piece, and the vibration is picked up by pickup unit 5. The picked-up signal is generally represented by a sine wave as shown by a waveform a in FIG. 2. The maximum amplitude L of the signal corresponds to the amount of the unbalance and, therefore, the amount is indicated on meter 7.

Since stroboglow lamp 8 is excited by pulses in synchronization with rotation of test rotor piece, numbers marked on test rotor piece 2 appear stationary and can be readily read. Because an angular position on bearing 1 which is corresponding to a certain phase of the signal from pickup unit 5 is determined in dependence on kinds of the pickup unit. For example, if the velocity pickup unit is used and if pulses are formed to present at every 180° phases of the sine curve signal a, as shown by b in FIG. 2, an end of a horizontal diameter of the rotor which appears stationary is the position on which the dynamic unbalance is located. Thus, if test rotor piece 2 is rotated in a direction indicated by an arrow A in FIG. 2, the angular position indicated by the number "3" marked on test rotor piece 2 is the location of the unbalance. The operator, therefore, reads the number on test rotor piece 2 at a predetermined angular position on bearings and know the angular location of unbalance of the test rotor piece.

In the stroboscopic method, either one of the numerals marked on the test rotor piece is scarecely viewed at the predetermined angular position on bearings. Therefore, the operator must read the number nearest the predetermined angular position and memorize it.

Accordingly, the stroboscopic method is accompanied with disadvantages as described hereinbefore.

Figure 3:
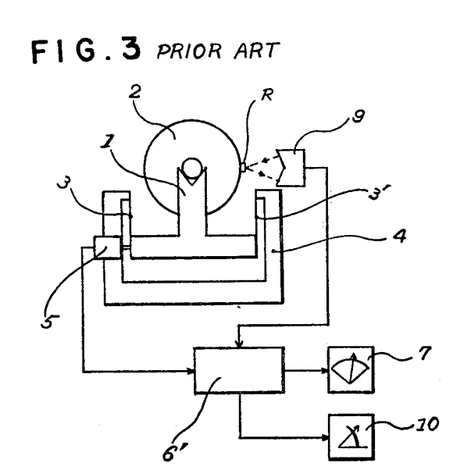
FIG. 3 is a schematic view of another known photocell-type dynamic balancing machine.
Figure 4:
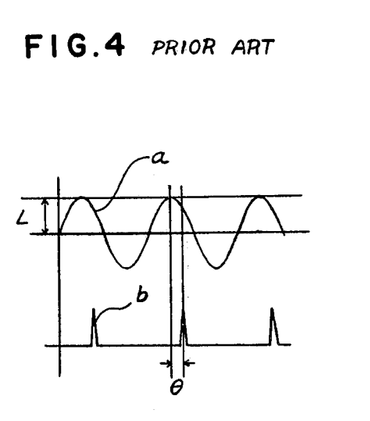
FIG. 4 is a view illustrating waveforms of two signals at different portions in the machine of FIG. 3.

Referring to FIG. 3, another known balancing machine of the photocell type which is shown therein, is similar to the stroboscopic type in detection of the amount of the unbalance but is different from it in detection of the angular location of the unbalance. Therefore, the machine also has flexible bearings 1 supported elastically horizontally movable on mounts 4 by leaf springs. A pickup unit 5 is coupled with bearing 5 to pick up once-per-revolution vibratory motion of bearing 1 or forces on bearing 1. The picked-up signal is applied to an electronic circuit 6' and the unbalance amount is indicated on a meter 7 accompanied with electronic circuit 6'. The machine is provided with a photocell unit 9 which comprises a light source and a photocell. The photocell unit 9 is fixedly disposed near bearing 1 to confront the axial end portion of test rotor piece 2 which is supported on bearing 1. Before measuring a reference mark R is deposited on test rotor piece 2, and the mark is read out by photocell unit 9 once-per-revolution of the rotor. The read-out signal is applied to electronic circuit 6' and is compared with the signal from pickup unit 5 to indicate the unbalance angle on a meter 10. Referring to FIG. 4, the signal from pickup unit 5 represented by a sine wave as shown by a waveform a in FIG. 4. On the other hand, the signal from photocell unit 9 is a pulse train as shown by a waveform b in FIG. 4. As described above, because an angular position on bearings 1 which is corresponding to a certain phase of the signal from pickup unit 5 is determined in dependence on kinds of the pickup unit. Therefore, considering the angular location of photocell unit 9, the angular position of the unbalance is computed from a phase difference $\theta$ between each maximum amplitude of the signal from pickup unit 5 and each pulse from photocell unit 9. The computation is performed in electronic circuit 6', and the computed angle is then indicated on meter 10 assuming the reference mark R to be 0°.

According to the photocell method, the angle of the unbalance location in the test rotor piece can be obtained from reading of meter 10. However, it is difficult to estimate the position of the unbalance on the rotor piece. This results in error of correction of the unbalance, as described hereinbefore. Moreover, the photocell unit sometimes picks up external noise light, so that an erroneous angle may be indicated on the angle meter.

The present invention attempts to detect the angular location of the unbalance in rotor pieces and simultaneously position the detected angular location to a predetermined angular position on a test machine.

Figure 5:
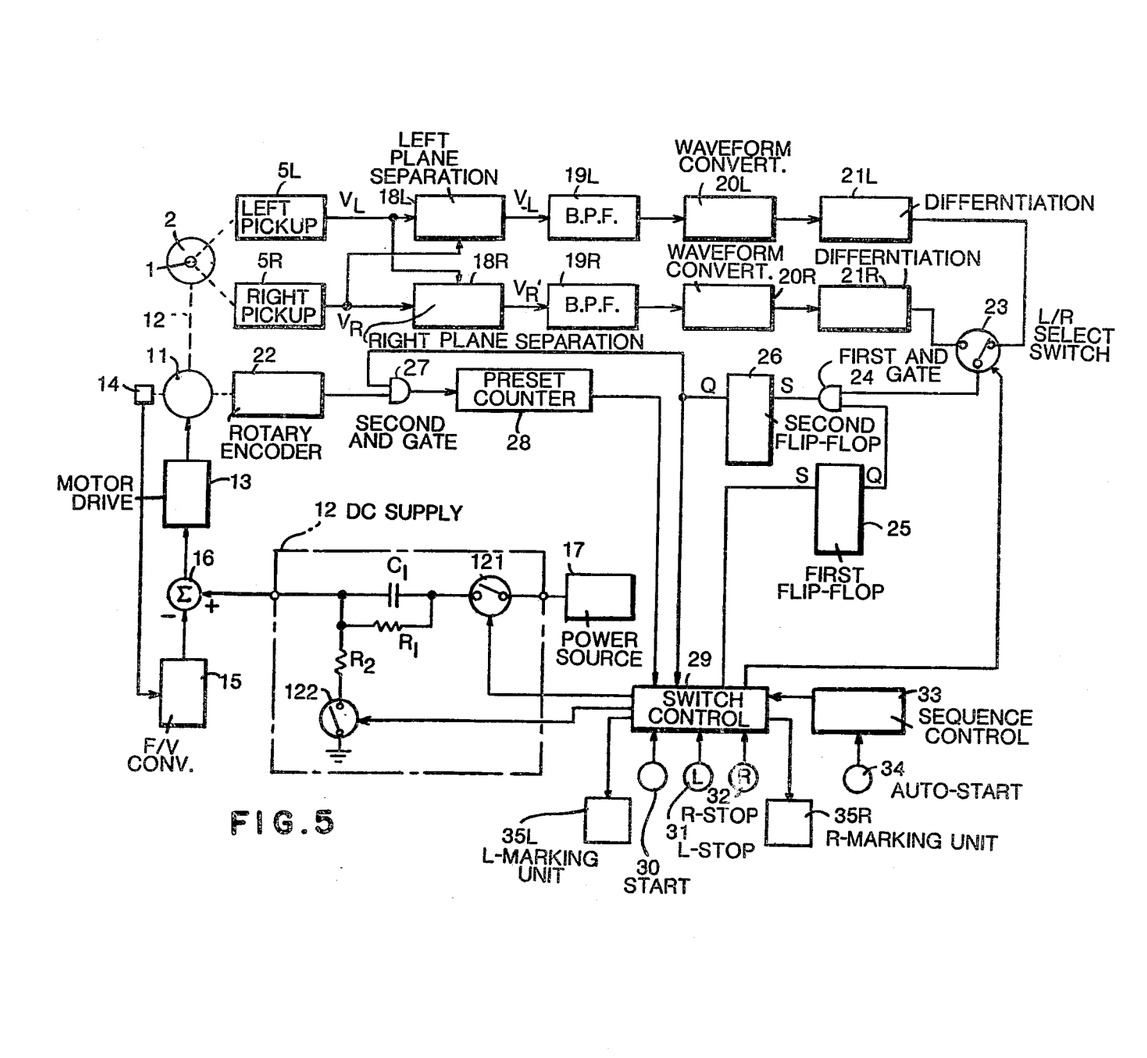
FIG. 5 is a diagrammatic view of an embodiment of the present invention.

Referring to FIG. 5, an embodiment shown therein includes flexible bearings 1 for rotatably supporting test rotor piece 2 and pickup unit 5, similar to the known dynamic balancing machines so described above. Two pickup units 5L and 5R are coupled with left and right flexible bearings to support test rotor piece 2 as axial ends thereof.

Test rotor piece 2 is rotated by a DC servomotor 11 through a rotation transmitting means 12 such as belt drive. Servomotor 11 is speed-controlled by a motor control circuit. The motor control circuit includes a DC supply 12, a drive circuit 13 for feeding a drive voltage to servomotor 11, a speed sensor 14 for detecting motor speed, a frequency-voltage converter 15 to generates DC voltage corresponding to the detected motor speed, and a substractor 16 for subtracting the output DC voltage of frequency-voltage converter 15 from the output DC voltage of DC supply 12. The subtracted DC voltage is applied to motor 11 through motor drive circuit 13. So that, if the DC voltage supplied from DC supply 12 is constant, motor 11 is controlled to rotate at a constant speed.

DC supply 12 includes a capacitor $C_1$ and a resistor $R_1$ connected in parallel with one another, and the parallely connected capacitor and resistor are interposed between the output of DC supply 12 and a main switch 121. Accordingly, when main switch 121 is closed, capacitor $C_1$ is charged with a time constant $C_1 \times R_1$. *Therefore, motor 11 is driven by a high voltage which is gradually decreased, and is driven by a constant voltage after capacitor $C_1$ is charged up.* DC supply 12 also includes another resistor $R_2$ and a switch 122 connected in series with resistor $R_2$ to ground the output therethrough. Therefore, when switch 122 is closed, the output voltage of DC supply 12 is reduced with a time constant $R_2 \times C_1$. Accordingly, motor speed reduces. Therefore, when main switch 121 is opened, motor 11 immediately stops. Resistors $R_1$ and $R_2$ may be preferably variable resistors so that time constants $R_1 \times C_1$ and $R_2 \times C_1$ may be adjusted.

During rotation of test rotor piece 2, vibration signals $V_L$ and $V_R$ which are generally sine wave signals are output from both pickup units $5_L$ and $5_R$, similar to known machines as described above. Those signals are applied to left and right plane separation circuits 18L and 18R.

Left plane separation circuit 18L is for removing effects due to unbalance at the right plane of test rotor 2 from the left vibration signal $V_L$ of left pickup unit $5_L$. That is, the vibration signal $V_R$ from right pickup unit 5R is multiplied by a constant k ($k \leq 1$) and the resulted signal is subtracted from the left vibration signal $V_L$ from left pickup unit $5_L$. Thus, the output signal $V'_L$ from left plane separation circuit 18L is free from the unbalance at right side plane of test rotor piece 2.

Right plane separation circuit 18R provides the plane-separated right vibration signal which is free from the effects of the unbalance at left side plane of test rotor piece 2. The waveform of output signal from each plane separation circuit 18L and 18R is shown by a curve a in FIG. 6.

The outputs of left and right plane separation circuits 18L and 18R are applied to band-pass filter 19L and 19R respectively to eliminate background vibrations therefrom. The output from each band-pass filter 19L and 19R is shown by a waveform b in FIG. 6.

Figure 6:
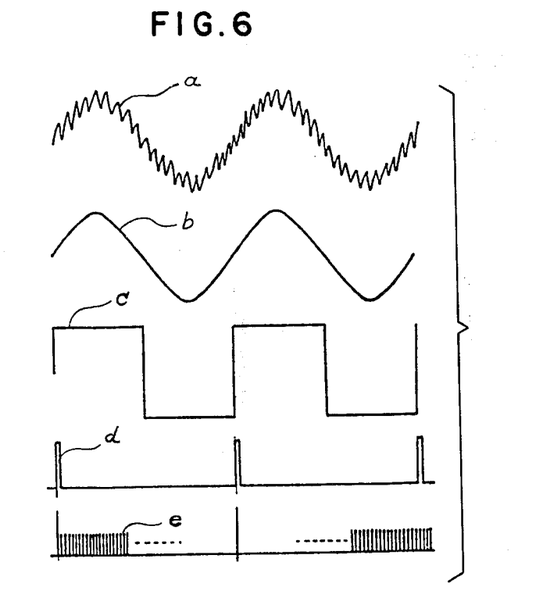
FIG. 6 is a view illustrating waveforms of five signals at different portions in the embodiment of FIG. 5.

The outputs of band-pass filters 19L and 19R are converted to rectangular wave signals as shown by a waveform c in FIG. 6. at respective waveform converting circuits 20L and 20R such as limiters, and are, thereafter, differentiated at respective differentiation circuits 21L and 21R. The differentiated pulse signal is shown by a waveform d in FIG. 6.

A rotary encoder 22 comprises a rotary disk having a plurality of, for example, 400 apertures which are formed equiangularly spaced positions, a light source fixedly disposed at one side of the rotary disk and a photocell fixedly disposed on the other side of the rotary disk and confronting the light source. The rotary disk is coupled with motor 11 and is rotated by the motor. Accordingly, pulses are output from the photocell during rotation of motor 11 as shown by a waveform e in FIG. 6 because the apertures pass between the light source and the photocell.

Since the disk rotor is rotated by motor 11, the number of pulses output from rotary encoder 22 during one revolution of motor 11 is constant and not dependent on the rotation speed motor 11. On the other hand, since test rotor piece 2 is also rotated by motor 11, the number of pulses from rotary encoder 22 during a complete revolution of test rotor piece 2 is also constant even if motor speed is changed. Accordingly, each pulse indicates rotation of test rotor piece 2 over a certain angular extent which is determined by a ratio of rotation number per minute of test rotor piece 2 and the disk rotor of rotary encoder 22 and by the angular space between adjacent apertures of the disk rotor. Therefore, the output pulses from rotary encoder 22 will be referred to as angular pulses.

A selector switch 23 is for selecting a desired one of the outputs of two differentiation circuit 21L and 21R. The output selected selector switch 23 is coupled with an input terminal of a first AND gate 24, the other input terminal of which is coupled with an output terminal Q of a first flipflop circuit 25. The output terminal of first AND gate 24 is coupled with a SET input terminal S of a second flipflop circuit 26. Therefore, when first flipflop circuit 25 is set, the output signal selected at selector switch 23 passes first AND gate 24, and set second flipflop circuit 26. An output terminal Q of second flipflop circuit 26 is coupled with an input terminal of a second AND gate 27. The other input terminal of second AND gate 27 is coupled with the output of rotary encoder 22. The output of second AND gate 27 is coupled with a preset counter 28. Therefore, when second flipflop circuit 26 is set, pulses from rotary encoder 22 passes second AND gate 27 and are counted at preset counter 28. Preset counter 28 provides an output signal at a time when the input pulses are counted up to the number preset in the counter.

A switch control circuit 29 is provided for controlling on-off operations of switches 121 and 122 and selecting operation of selector switch 23. Switch control circuit 29 is coupled with three kinds of manually operated switches, that is, a start switch 30, a left selection and stop switch (L-stop switch) 31, and a right selection and stop switch (R-stop switch) 32. These switches are preferably pushbutton switches. Switch control circuit 29 is also couples with the output of second flipflop circuit 26 and the output of preset counter 28.

Functions of switch control circuit 29 are as follows:

When start switch 30 is operated, switch control circuit 29 controls to turn on main switch 121. Thereafter, when L-stop switch 31 is operated, switch control circuit 29 controls selector switch 23 to select the output of left differentiation circuit 21L and simultaneously provides a set signal to a set input terminal of first flipflop circuit 25. Alternatively, when R-stop switch 32 is operated, switch control circuit 29 controls selector switch 23 to select the output of right differentiation circuit 21R and also provides a signal to set first flipflop circuit 25. Thereafter, upon receipt of the output Q of second flipflop circuit 26, switch control circuit 29 turns on switch 122. Thereafter, switch control circuit 29 turns off both of switches 121 and 122 at a time when the output of preset counter 28 is received thereat.

Switch control circuit 29 having those functions is formed by simple combination of logic circuits and designation of the circuit will be readily made by those skilled in the art. Therefore, circuitry formation of switch control circuit 29 is omitted for purpose of simplification of the description and the drawings.

Figure 7:
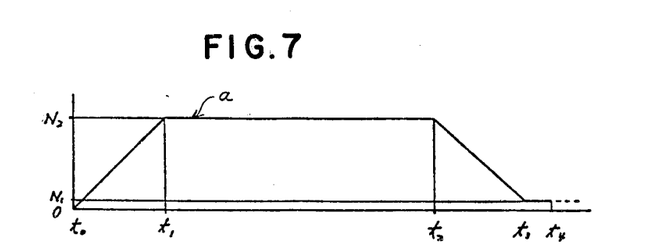
FIG. 7 is a view illustrating variation of rotation speed of a drive motor in FIG. 5.

In operation, when the operator pushes start switch at a time $t_0$ after he sets a test rotor piece 2 to be rotated on bearings 1 by motor 11 and sets a certain number in preset counter 28, main switch 121 is closed by control of switch control circuit 29, so that motor 11 starts to rotate. Motor speed gradually increases according to the time constant $R_1 \times C_1$ and reaches the constant rotation number per minute or $N_1$ r.p.m. at a time $t_1$, as shown in FIG. 7.

Since test rotor piece 2 and the rotary disk of rotary encoder 22 are rotated by rotor 11, differentiated pulses as shown by d in FIG. 6. are output from respective differentiation circuit 21L and 21R with a pulse width and a pulse interval which vary according to rotation speed of motor 11. Angular pulses as shown by e in FIG. 6 are also output from rotary encoder 22 with a pulse width and a pulse interval which also vary according to motor speed.

When the operator pushes either one of L-stop switch 31 and R-stop switch 32, for example, L-stop switch 32, at a time $t_2$, the following equation is automatically performed under control of switch control circuit 29.

The output of differentiation circuit 21L is selected by selector switch 23 to be applied to first AND gate 24, and first flipflop circuit 25 is set simultaneously to open first a AND gate 24. Therefore, the differentiated pulses of differentiation circuit 21L are applied to second flipflop 26 through first AND gate 24, so that second flipflop circuit 26 is set at a time $t_{20}$ by an initial differentiated pulse from differentiation circuit 21L after L-stop switch is pushed.

The output Q of second flipflop circuit 26 as set is applied to second AND gate 27 and switch control circuit 29. Then, second AND gate 27 is opened to permit angular pulses from rotary encoder 22 to be input to preset counter 28, and switch 122 is simultaneously closed so that speed of motor 11 is reduced according to the time constant $R_2 \times C_1$.

When preset counter 28 counts input angular pulses up to the number preset therein, or output signal is applied to switch control circuit 29, and switches 121 and 122 are then opened. Motor 11, test rotor 2, and the rotary disk of rotary encoder 22 immediately stops because speed of motor 11 is already reduced sufficiently, for example, to a slow speed $N_2$ r.p.m. which is almost 0 as shown in FIG. 7.

When R-stop switch 32 is pushed in place of L-stop switch, the output from right differential circuit 21R is selected by selector switch 23, and second flipflop circuit 26 is set by the selected differentiated pulse. Thereafter, the similar circuit operation is performed and test rotor piece 11 stops at a time when preset counter 28 outputs a signal.

An angular position on bearings 1 which is corresponding to a certain phase of the vibration signal $V'_L$ or $V'_R$ from pickup unit 5L or 5R is determined in dependence of the type of the pickup unit, as described above.

Figure 8:
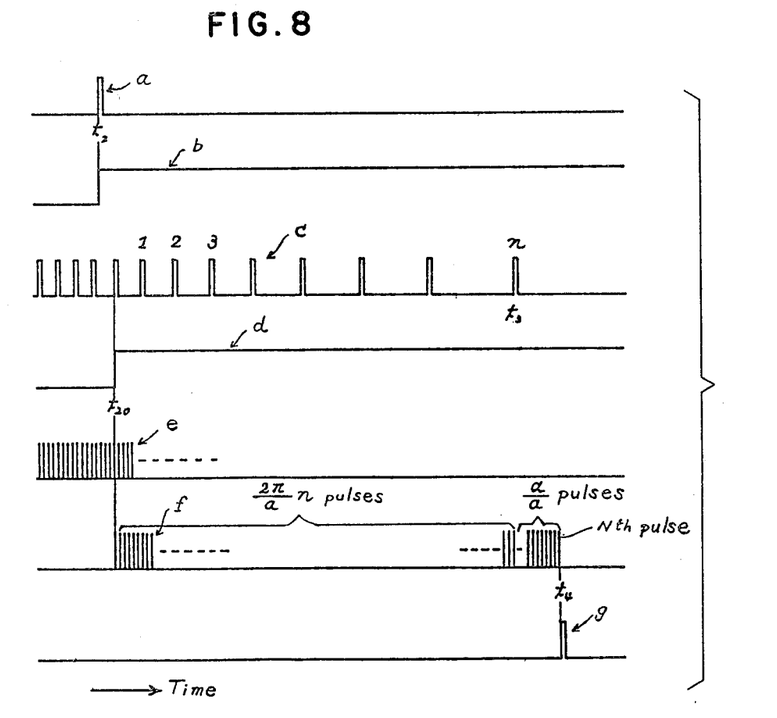
FIG. 8 is a view for explaining operation of the embodiment of FIG. 5 with seven signals at different portions shown on a time axis.

If a velocity pickup unit is used for each pickup unit 5L and 5R, an angular position or a reference angular position on each bearing 1 corresponding to phases of $2m\pi$ ($m = 0, 1, 2, 3, \ldots$) of the vibration signal is at one side of the rotary axis of test rotor piece 2 on bearings 1 and on a horizontal plane including the rotating axis. On the other hand, as the vibratory signal from each pickup unit of 5L and 5R is converted into a rectangular wave signal and is, thereafter, differentiated, the pulses from each differentiation circuit 21L and 21R present at every phases of $2m\pi$ of the vibration signal, or will be understood from comparison of waveforms b, c, and d in FIG. 6. That is, the differentiated pulses present at every times when the unbalance point of each plane of test rotor piece 2 passes the reference angular position. Furthermore, each pulse from rotary encoder 22 indicates rotation of test rotor piece 2 over a unit angular extent a as described above. Therefore, assuming that a number N is preset in preset counter, test rotor piece 2 stops after rotating by a rotation number expressed by $aN/2\pi$. The quotient of $aN/2\pi$ is expressed by $(n+b)$, where $n=0, 1, 2, \ldots$, and $0 \leq 1 \leq b$. This means that, when test rotor piece 2 stops, the angular location of the unbalance of the test rotor piece 2 is positioned at an angular point of an angle $\alpha$ what is expressed by $2\pi b$ (or $\alpha = 2\pi b$) from the reference angular position. This will be readily understood by referring to FIG. 8 in which various signals in the embodiment of FIG. 5 are illustrated on a time axis. In FIG. 8, a is a signal from L-stop or R-stop signal, b is the output signal of first flipflop circuit 25, c is the differentiated pulse in the selected one of differentiation circuits 21L and 21R, d is the output signal of second flipflop circuit 26, e is angular pulses from rotary encoder 22, f is pulses input to preset counter 28 and g is an output signal from preset counter.

Even if test rotor piece 2 is changed for a different one, it will be readily understood from above descriptions that the unbalance location is also positioned at the same angular position of the angle $\alpha$ from the reference angular position, if the other conditions are changed. Therefore, in the embodiment of this invention, it is possible to detect automatically the angular location of unbalance of a test rotor piece and to position simultaneously the angular location of unbalance to a desired angular position on the machine by predetermining the number preset in the preset counter.

If the belt drive arrangement is used for transmitting rotation from the motor to the test rotor piece, the ratio of rotation speed of the test rotor piece and the rotary disk of the rotary encoder changes in tests of different rotor pieces having different diameters. However, the unbalance location either one of the rotor pieces can be positioned to the same angular position on the machine in tests of the rotor pieces by adjusting the preset counter.

The embodiment of FIG. 5 has a sequence control circuit 33 accompanying with a manually operating switch 34 such as a push button switch for starting automatic measurement of two left and right planes of a test rotor piece. Sequential control circuit 33 has a timer which starts at a time when the automatic start switch 34 is pushed. After starts of the timer, sequential control circuit 33 sends out to switch control circuit 29 four signals as predetermined time intervals. First signal is corresponding to operation of start switch 30, and second signal corresponds to the signal applied to switch control circuit 29 by pushing L-stop switch 31 (or R-stop switch 32). Third signal is again corresponding to the control start signal from start switch 30 and the last signal corresponding to the signal from R-stop switch 32 (or L-stop switch 31). Thus, measurements of unbalances on two right and left planes of a test rotor piece can be sequentially performed.

When the sequence control is used, an automatic marking arrangement which will be described hereinafter may be employed.

Thus, since unbalance locations can be positioned to a predetermined angular position on the machine in tests of a plurality of rotor pieces, the operator can readily perform to work correctly the unbalance location of each test rotor piece. In addition, it is possible to use an arrangement for automatically marking the unbalance location of the test rotor piece.

Figure 9:
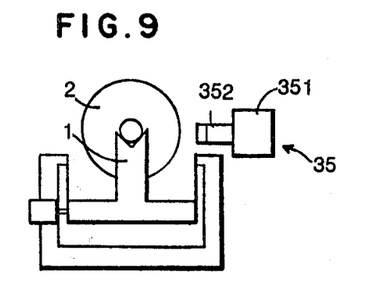
FIG. 9 is a schematic view of another embodiment in which an automatic marking device is used.

Referring to FIG. 9, an automatic marking device 35 comprises a magnetic solenoid and a plunger unit 351-352 and a stamp element 353 fixed at an end of plunger 352. Stamp element 353 is, for example, a porous body in which paint, in or other marking agents is soaked.

Two automatic marking device 35 at fixedly disposed at predetermined angular positions near respective right and left flexible bearings 1 to confront the outer surface of the test rotor piece 2 which is supported on bearings 1.

Referring to FIG. 5, switch control circuit 29 is also shown to control two right and left automatic marking devices 35R and 35L. In dependence on whether the left plane of test rotor piece 2 or the right plane is tested, switch control circuit 29 provides a signal to left automatic marking device 35L or right automatic marking device 35R. Then, solenoid 351 of the marking device which receives the signal is energized so that stamp element 353 impacts the outer surface of test rotor piece 2. Thus, marking of unbalance location of the test rotor piece is automatically completed.

An unbalance correction machine may be used in place of the automatic vending machine. Then, detection and correction of unbalance of a rotor piece can be automatically carried out sequentially.

In the embodiment of FIG. 5, speed sensor 14 is used. However, it can be omitted if the output of rotary encoder 22 is used in place of the motor speed signal.

A stepping motor may be used in place of the DC servo motor for driving the rotor piece. In case the stepping motor is used, the rotary encoder may be omitted and the motor drive pulses are used as the angular pulses.

Figure 10:
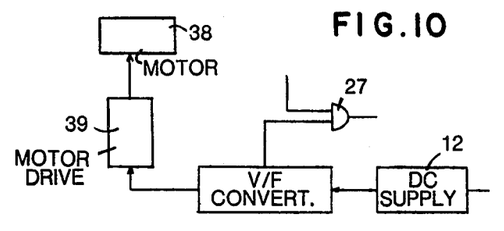
FIG. 10 is a diagrammatic view of a modified portion in a modification of the embodiment of FIG. 5.

Referring to FIG. 10, the output of DC supply 12 of FIG. 5 is converted into pulse signals as a voltage-frequency converter 37. The converted pulses are applied to a stepping motor 38 through a motor driver circuit 39. Stepping motor rotates over a predetermined angular extent per one pulse. Therefore, the output pulses of voltage-frequency converter 37 is also used in place of the angular pulses from rotary encoder 22 of FIG. 5. In case, the output of voltage-frequency converter 37 is applied to one input terminal of second and gate 27. In the above described embodiments, the angular pulse indicating rotation of the test rotor piece over a unit angular extent is obtained not from actual rotation of the test rotor piece but from rotation of the drive motor. Therefore, when rotational inertia of a test rotor piece is considerably greater than that of the drive motor, slip is often caused between them at start and stop of rotation if transmission of rotation is made by belt means. This means error is caused in detection of the unbalance location of the test rotor.

Figure 11:
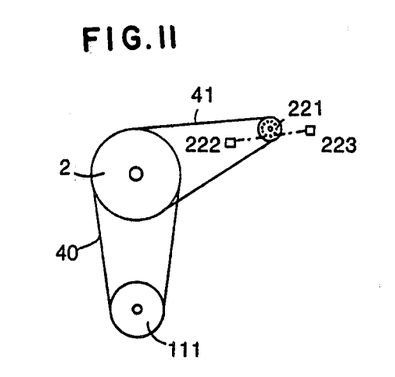
FIG. 11 is a schematic side view of an embodiment for driving the test rotor piece and a disk of a rotary encoder.

In order to remove such a disadvantage, the rotary encoder may be coupled with the test rotor piece. Referring to FIG. 11, a belt 40 is wound on an output wheel 111 of motor 11 and test rotor piece 2. Another belt 41 is wound on test rotor piece 2 and a rotary disk 221. When test rotor piece 2 is rotated by motor 11 through belt 40, rotary disk 221 is also rotated through belt 41. Even if slip is caused between motor 11 and test rotor piece 2, rotary disk 221 reliably follows the rotation of test rotor piece 2 through belt 41 without slip because rotational inertia of rotary disk is sufficiently smaller than that of test rotor piece. Therefore, the angular pulses are obtained in response to actual rotation of the test rotor piece, so that error may not be caused in detection of the unbalance location of the test rotor piece. In FIG. 11, a light source 222 and a photocell 223 are schematically shown.

In the above described embodiments, detection of the amount of the unbalance has not been described because it can be carried out by means known in the prior art. For example, AC current meters or AC voltage meters may be connected to outputs of band-pass filters 19L and 19R. These meters indicate the amount of unbalance on respective planes, during rotation of motor 11 at a constant speed. Alternatively, DC meters may be connected through rectifier circuits.

This invention has been described in detail in connection with specific embodiments but those are examples only. It will be readily understood by those skilled in the art that various modifications and other designations are readily made within the scope of the patent invention.

What is claimed is:

1. A system for automatically detecting an angular location of unbalance of a rotor piece and simultaneously positioning the location to a predetermined stop angular position, which comprises;

two bearing means for rotatably supporting the axially opposite ends of the rotor piece to be tested;
   drive motor means having motor controlling means;
   means for transmitting rotation of said drive motor means to the test rotor piece supported by said bearing means;
   pickup means coupled with at least one of said bearing means for picking up once-per-revolution vibratory motion of said bearing means or forces on said bearing means due to dynamic unbalance of the test rotor piece as a vibration signal;
   pulse forming circuit means for forming phase indicating pulse signals from said vibration signal, said phase indicating pulse signals being presented at each of a plurality of predetermined phase intervals of said vibration signal and indicating the unbalance location passing a reference angular position;
   pulse generating means for generating angular pulse signals, each of said angular pulse signals indicating rotation of the test rotor piece over a predetermined unit angular extent;
   preset counter means in which a number of $(2\eta\pi + \alpha)/a$ can be preset, where n is a predetermined rotation speed of the test rotor piece, $\alpha$ being an angle between said predetermined stop angular position and said reference angular extent;
   means for generating a motor speed reduction signal which is fed to said motor drive controlling means to reduce rotational speed of said drive motor means;
   means coupled with said pulse forming circuit means and said motor speed reduction signal generating means and said pulse generating means for transmitting said angular pulse signals to said preset counter means after receiving one of said phase indicating pulse signals following said motor speed reduction signals; and
   said preset counter means providing a signal to stop said drive motor means at a time when said angular pulse signals are counted up to the preset number, whereby said drive motor means is immediately stopped so that the unbalance location of the test rotor piece is positioned to said predetermined stop angular position.

2. The system as claimed in claim 1, further including a second vibration signal pickup means coupled respectively with the other of said two bearing means, and selecting means for selectively connecting one of said pickup means to said pulse forming circuit means.

3. The system as claimed in claim 1, wherein said pulse forming circuit means comprises filter means for removing background noise signals, waveform converting circuit means for converting the filtered signal to rectangular waveform signal, and differentiation circuit means to generate said phase indicating pulse signals from said rectangular wave signal.

4. The system as claimed in claim 1, wherein said angular pulse signals transmitting means comprises first flipflop circuit means which are set by reception of said motor speed reduction signal, first gate circuit means which is opened by a set output from said first flipflop circuit means to permit said phase indicating signals to pass therethrough, second flipflop circuit means which are set by reception of one of said phase indicating pulse signals from said first gate circuit means, and second gate circuit means which is opened by the set output from said second flipflop circuit means to permit said angular pulse signals to pass to said preset counter means.

5. The system as claimed in claim 1, wherein said pulse generator means comprises a disk plate rotated by said drive motor means and having a plurality of marks which are equiangularly spaced on a circle about the rotating axis of said disk plate, and reading head means fixedly disposed and reading out said marks to provide said angular pulse signals during rotation of said disk plate.

6. The system as claimed in claim 5, wherein said marks are apertures perforated in said disk plate, and said reading head means comprises a light source and a photo-electric cell interposing said disk plate.

7. The system as claimed in claim 5, wherein said disk plate is coupled with an output shaft of said drive motor means.

8. The system as claimed in claim 5, wherein said disk plate is arranged to be coupled with the test rotor piece or said bearing means by a belt means whereby said disk plate is rotated in response to rotation of said test rotor means.

9. The system as claimed in claim 8, wherein said drive pulse providing means are commonly used as said pulse generating means so that drive pulse signals of said drive pulse providing means are used as said angular pulse signals.

10. The system as claimed in claim 1, wherein said drive motor means is a stepping motor having a drive pulse providing means.

11. The system as claimed in claim 1, wherein there are two vibration signal pickup means coupled respectively with said two bearing means, two pulse forming circuit means coupled respectively with said two vibration signal pickup means, and forming respectively phase indicating pulse signals from respective output signals of said two vibration signal pickup means, each phase indicating pulse signals presenting at every predetermined phases of each vibration signal and indicating the unbalance location passing a reference angular position, and selecting means for selecting one of said two pulse forming circuit means to be coupled with said angular pulse signals transmitting means.

12. The system as claimed in claim 2 or 11, which further comprises two plane separation circuit means coupled respectively with said two vibration signal pickup means, each plane separation circuit means receiving the output signal if the other vibration signal pickup means and suppressing a vibratory component due to an unbalance of said test rotor piece on the side of said the other pickup means.

13. The system as claimed in claim 11, which further comprises control circuit means having a manually operated start switch means, and manually operated plane selection switch means, said control circuit means providing a first signal for starting said drive motor means in response to to operation of said start switch means, a second signal for controlling said selecting means in response to operation of said plane selection switch means, said motor reduction signal, and a fourth signal for stopping said drive motor means in response to the output from said preset counter.

14. The system as claimed in claim 13, which further comprises sequence control circuit means for sequentially generating a fifth signal for starting operation of said rotor means, a sixth signal for operation of said plane selection switch means to select one of said two pulse forming circuit means, said fifth signal, and a seventh signal for operation of said plane selection switch means to select the other pulse forming circuit means with predetermined time intervals therebetween, said fifth, sixth and seventh signals sent out to said control circuit means whereby the measurement of axial opposite sides of said rotor piece may be automatically sequentially performed.

15. The system as claimed in claim 13 or 14, which further comprises two marking means fixedly disposed at said predetermined angular positions adjacent said flexible bearing means respectively and for marking on the outer surface of the test rotor means on said bearing means, and drive means to drive each marking means, said drive means controlled by said control circuit means to operate after said drive motor means stops.

16. In a dynamic balancing machine for detecting amount and angular location of unbalance in a rotor piece and having drive motor means for rotating the rotor piece to be tested and pickup means for picking up vibration of said rotating test rotor piece due to the unbalance, the improvement which comprises pulse forming circuit means for forming phase indicating pulse signals from said vibration signal, said phase indicating pulse signals representing predetermined phases of said vibration signal and indicating the unbalance location passing a reference angular position; pulse generating means for generating angular pulse signals each of said angular pulse signals indicating rotation of the test rotor piece over a predetermined unit angular extent; preset counter means in which a number of $(2\eta\pi + \alpha)/a$ can be preset, where n is a predetermined rotation speed of the test rotor piece, $\alpha$ being an angle between said predetermined stop angular position and said reference angular position, and a being said unit angular extent; means for generating a motor speed reduction signal which is fed to said drive motor means to reduce rotational speed thereof means coupled with said pulse forming circuit means and said motor speed reduction signal generating means and for transmitting said angular pulse signals to said preset counter means after receiving one of said phase indicating pulse signals following said motor reduction speed signal; and said preset counter means providing a signal to stop said drive motor means at a time when said angular pulse signals are counted up to the preset number, whereby said drive motor means is immediately stopped so that the unbalance location of the test rotor piece is positioned to a predetermined stop angular position.

* * * * *